May 18, 1948.  F. SAVOYE  2,441,674
STEREOSCOPIC MOTION PICTURE PROJECTION SYSTEM
Filed July 13, 1945  3 Sheets-Sheet 1

François Savoye
INVENTOR
By Otto Munk
his ATTY.

May 18, 1948.  F. SAVOYE  2,441,674
STEREOSCOPIC MOTION PICTURE PROJECTION SYSTEM
Filed July 13, 1945   3 Sheets-Sheet 3

Francois Savoye
INVENTOR
his ATTY.

Patented May 18, 1948

2,441,674

UNITED STATES PATENT OFFICE 2,441,674

STEREOSCOPIC MOTION-PICTURE PROJECTION SYSTEM

François Savoye, Paris, France

Application July 13, 1945, Serial No. 604,870
In France October 8, 1942

Section 1, Public Law 690, August 8, 1946
Patent expires October 8, 1962

6 Claims. (Cl. 88—16.6)

This invention has for its object to provide improvements in and relating to appliances and apparatuses for shooting films.

For the projection of stereoscopic views appliances are already known which comprise a projection apparatus, a projection screen and a device for the selection of the left and right hand views of the stereoscopic pair; said selector device receives a movement of rotation the object of which consists, for instance, in causing the bands of right hand views projected on the screen to be followed by bands of left hand views; owing to this fact and to the persistence of the luminous impressions upon the retina each eye of the observer sees the right and left hand views together.

In such appliances it is particularly interesting to use as selector device a grid formed of a cylinder having a large diameter and rotating about its axis and inside which the projection screen is mounted, said cylinder being provided with parallel alternately opaque and transparent bands running along the generating lines of the cylinder.

With such appliances no selection in depth is possible.

Indeed, if the selection is normally effected for spectators placed at a certain distance, that is to say if the eyes of said spectators intercept a number of bars of the selection grid which is equal to the projected number of views, this is no longer true for spectators placed on a farther plane. Indeed, the eyes of these latter spectators intercept a larger number of bars of the selection grid. Accordingly, there is no longer a correspondence between the obtained and the projected elements of views.

The present invention has more particularly for its object to remedy to this drawback so as to extend in depth the plane of the eyes of the spectators, which makes it possible to increase the number of spectators able to have a perfect sight of the relief.

Appliances and apparatuses for the projection making it possible to attain the above mentioned objects possess the characteristic features resulting from the following description and appearing, more particularly, from the appended claims.

Such appliances and apparatuses for the projection are shown by way of example in the appended drawings, in which.

Figure 1:
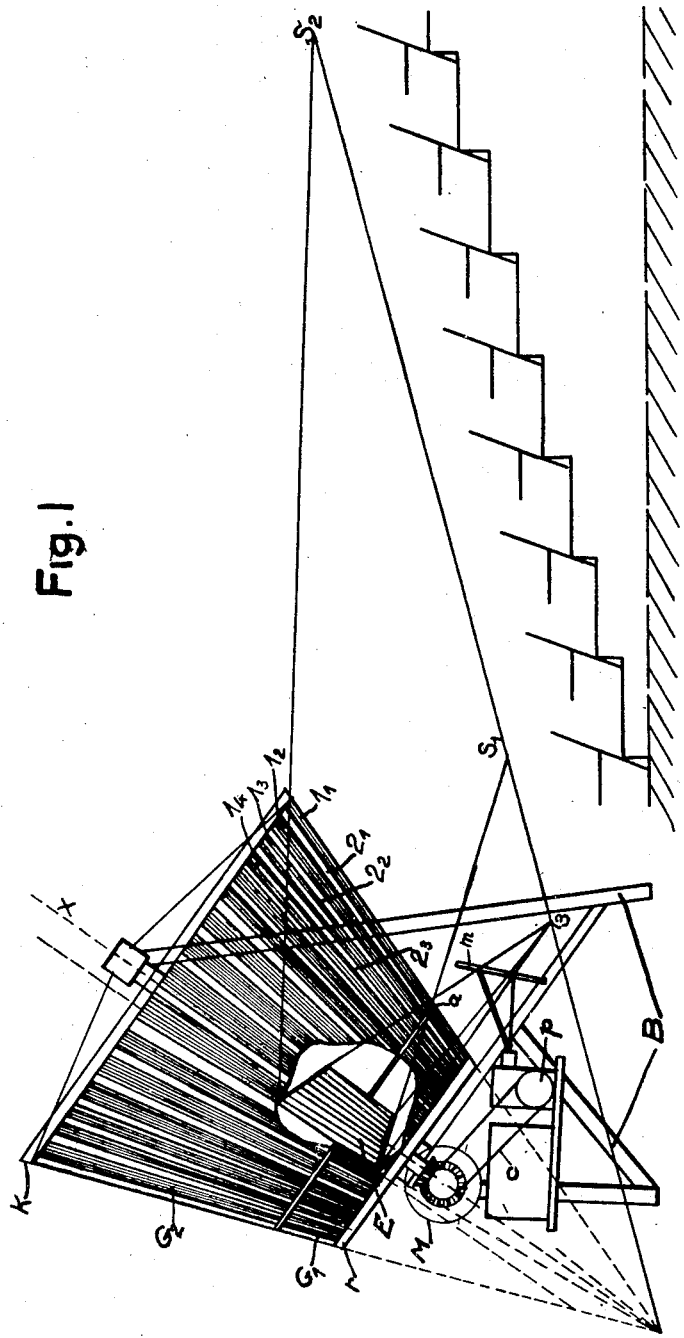
Figure 1 is a general perspective view of such an appliance.

The appliance shown in Figure 1 which is a perspective general view given by way of example comprises a projection grid $G^1$ and a sight grid $G^2$, both said grids forming together a frustum of a cone which can be rotated about its axis OX by means of a belt C and under the action of a motor M which also actuates the projection apparatus P. The projection screen E is mounted inside said frustum of a cone in a diametral plane.

Each grid $G^1$ and $G^2$ is formed of a series of opaque bands $l^1$, $l^2$, $l^3$ alternating with transparent bands $2^1$, $2^2$, $2^3$ .... All said bands converge towards the geometrical apex O of the frustum of a cone constituted by both grids $G^1$ and $G^2$. The plane of the eyes of the spectators passes thru said point O and thru the optical level 3 of the projector P in the direction $S^1$, $S^2$; the distance $S^1$ (first row of spectators) is in relation with the height of grid $G^1$ at $a$. The smaller said grid, the nearer the rows with respect to one another; accordingly, all the spectators having their eyes on the level comprised between $S^1$ and $S^2$ will perceive the relief correctly.

The unit formed of both grids is mounted on a frame B; the projection is effected indirectly by means of the mirror $m$, in order to reduce the mechanical coupling distance of the projector.

Preferably, there must be a constant speed ratio between the speed of the projector and the speed of rotation of the grid. Said synchronization has been obtained by the fact that the projection apparatus and the selection grids $G^1$ and $G^2$ are actuated by one and the same motor M. Of course, any other synchronization device can be used without departing from the scope and spirit of the invention.

The projection and sight grids can advantageously be formed of two wheels R and $r$, the wheel R which has a great diameter lying in the upper part of the projection room while the wheel $r$ the diameter of which is smaller lies in the lower part. Between both said wheels which are spaced from each other by a suitable distance trapezoidal bands are stretched the convergence point of which forms the geometrical apex of the so obtained frustum of a cone.

One sees that such an appliance insures an exact vision of the relief for spectators placed at different distances from the screen.

Figure 2:
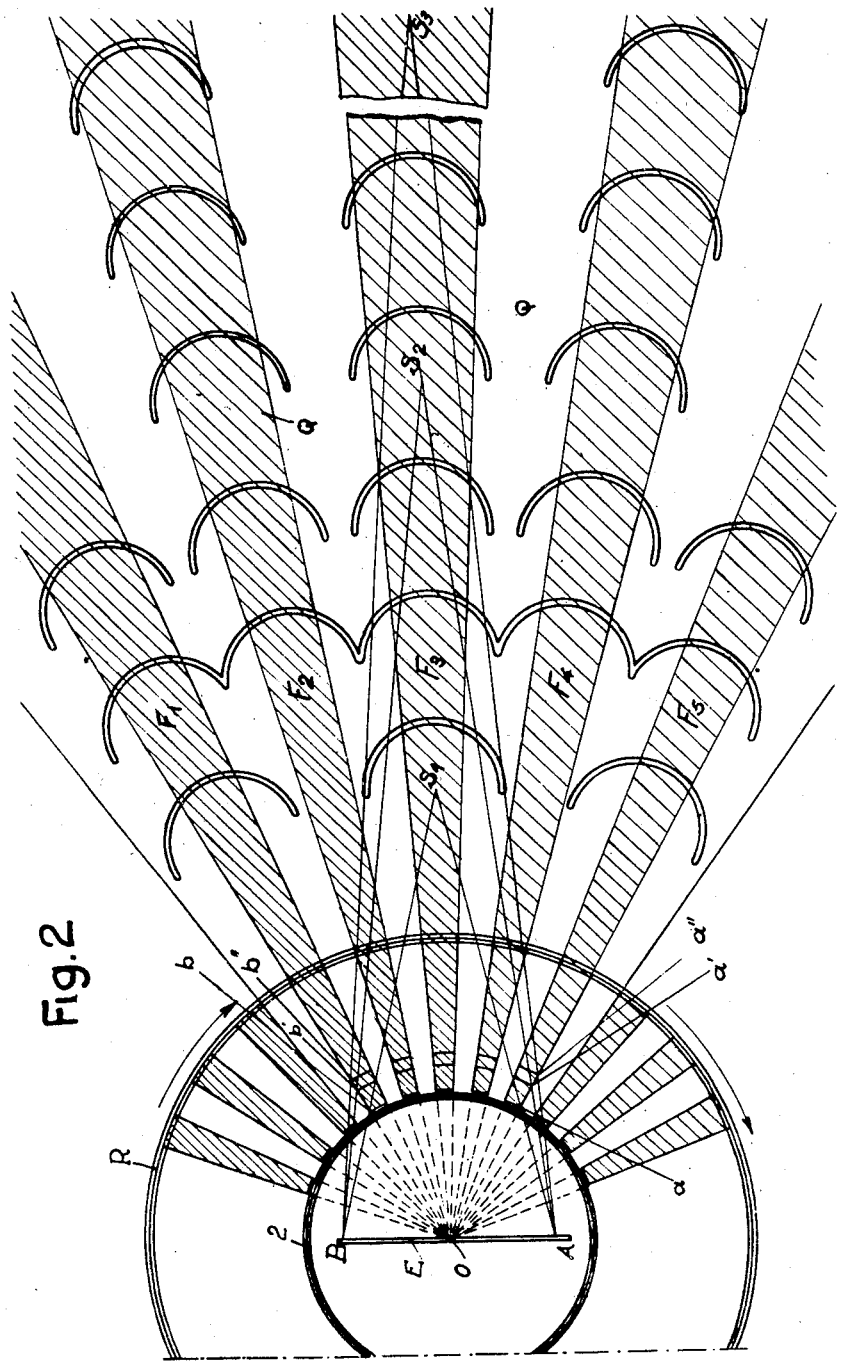
Figure 2 is a plane view showing an appliance according to the invention.

Indeed, a spectator in $S^1$ (Figure 2) intercepts the frusto-conical grid between the limits $a$ and $b$ thru the grid-bars 1—2—3—4—5. Another spectator placed farther from the screen at $S^2$ for instance, intercepts the same number of bars within the limits $a'$ and $b'$. The same is true for a spectator in $S^3$ the sights limits of whom are in $a''$ and $b''$, but who always intercepts the same number of grid bars. This result is possible because the width of the bars is increasing. Therefore, this appliance insures the vision of the relief for spectators placed at different distances on the plane passing thru the centre O of the frustum of a cone and the opaque centre 3 of the projector.

Preferably, however, the distribution of the seats in the room is to be made while taking into consideration the correct sight zones where left and right hand images can be seen by the corresponding eyes of the spectators exclusively. Owing to this fact the seats are to be arranged, preferably, in convergent lines in the direction of point O and around the latter, for instance at $F^1$, $F^2$, $F^3$, $F^4$, $F^5$.

Figure 3:
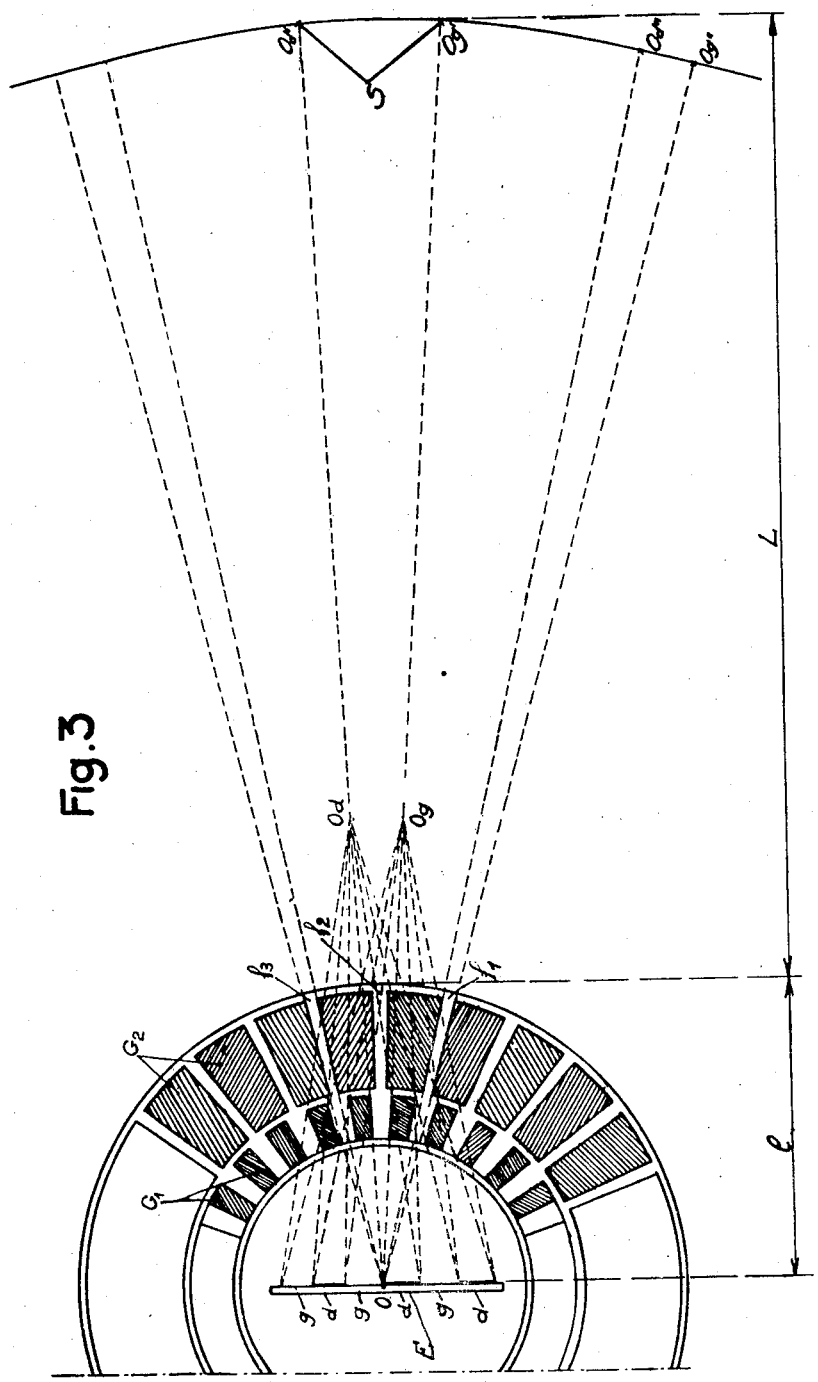
Figure 3 is a plane view showing another form of execution of the appliance of Figures 1 and 2.

Figure 3 shows another mode of execution of the projection and sight grids $G^1$ and $G^2$ in which the sight grid $G^2$ is smaller than the projection grid $G^1$. Said sight grid $G^2$ inserted between the projection object-glasses $O^d$ and $O^g$ is made in order to select on the screen E the left hand elements of images G and the right hand elements of images D which alternate with one another and are placed edge to edge. Therefore, said grid preferably possesses transparent bands instead of opaque bands. If the same ratio is kept for the sight grid $G^2$ between the widths of its bands it is then necessary that the distance between the eyes of an observer placed at S, for instance, is equal to the base of the triangle $o$—$od'$—$og'$ in order that said observer can select the left and right hand image elements with each one of his eyes. In order to make allowance for this remark it is necessary, for instance, to arrange the sight slot in the following manner: the eyes of the observer S being at $og''$ and $od''$ the sight slots $f^1$, $f^2$, $f^3$ must have a width which is at least equal to $$\frac{e \times l}{L}$$

in which formula $e$ is the distance between the eyes or between $og''$ and $od''$, $l$ is the distance between the grid $G^2$ and the screen E on the level for the passage of the sight ray, and $L$ is the distance between the screen E and the eyes of the observer S.

Therefore, said slots can have the same width on their whole length and this width can be perfectly suitable for all the rows of observers. The grid also comprises slots which are substantially rectangular and alternate with opaque trapezoidal bands.

The appliance comprising said double frusto-conical grid can be made with any projector system for stereoscopic films projecting both images of two suitably spaced points.

I claim:

1. Stereoscopic projection system comprising a projection selection grid for selecting from stereoscopic pictures projected therefrom partial left and right hand image elements, said projection selection grid including a plurality of projection selector bands converging geometrically towards a point of convergence, a sight selection grid for separating stereoscopic image elements viewed therethrough into left and right hand image elements, said sight selection grid including a plurality of sight selector bands converging geometrically towards said point of convergence, means for revolving both said grids synchronously about a common axis passing through said point of convergence, a projection apparatus for stereoscopic pictures including means for projecting the pictures through said projection selection grid, a projection screen arranged to receive the pictures projected from said apparatus through said projection selection grid, and to be viewed by spectators through said sight selection grid, and seats for the spectators so arranged that the plane containing the eyes of the spectators passes substantially through said point of convergence.

2. Stereoscopic projection system comprising a projection selection grid for selecting from stereoscopic pictures projected therefrom partial left and right hand image elements, said projection selection grid including a plurality of projection selector bands converging geometrically towards a point of convergence, a sight selection grid for separating stereoscopic image elements viewed therefrom into left and right hand image elements, said sight selection grid including a plurality of sight selector bands converging geometrically towards said point of convergence, means for revolving both said grids synchronously about a common axis passing through said point of convergence, a projection apparatus for stereoscopic pictures including means for projecting the pictures through said projection selection grid, the projection screen arranged to receive the pictures projected from said apparatus through said projection selection grid, and to be viewed by spectators through said sight selection grid, and seats for the spectators arranged along straight lines radiating from said point of convergence in such a manner that the plane containing the eyes of the spectators passes substantially through said point of convergence.

3. Stereoscopic projection system comprising a projection selection grid having the form of a frusto-cone for selecting from stereoscopic pictures projected therefrom partial left and right hand image elements, said projection selection grid including two parallel and coaxially spaced apart circular rim elements of different diameter corresponding to the two bases of the frusto-cone and mutually spaced trapezoidal opaque bands extending between said two rims and converging towards the imaginary apex of the frusto-cone, the sight selection grid in the form of a frusto-cone for separating stereoscopic image elements therefrom into left and right hand image elements, said sight selection grid having its imaginary apex coinciding with the imaginary apex of said projection selection grid and including two spaced apart circular rim elements of different diameter arranged parallel and co-axially with the rim elements of said projection selection grid and corresponding to the two bases of said second frusto-cone and mutually spaced trapezoidal opaque bands extending between said two rims and converging towards the common imaginary apex of the two frusto-cones, means for revolving said two grids synchronously about their common axis, a projection apparatus for stereoscopic pictures outside of said grids and including means for projecting the pictures through said projection selection grid towards the axis of rotation of said grids, a projecting screen disposed inside said grids in a position to receive the pictures projected through said projection selection grid and to be viewed by spectators from the outside of the grids through said sight selection grids, and seats for spectators so arranged that the plane containing the eyes of the spectators passes substantially through the common imaginary apex of said frusto-cones.

4. Stereoscopic projection system, as claimed in claim 3, in which the seats of the spectators are arranged along lines radiating from the imaginary apex of said frusto-cones.

5. Stereoscopic system, as claimed in claim 3, in which the smaller base of the frusto-cone forming the sight selection grid coincides substantially with the larger base of the frusto-cone forming the projection selection grid, and the slant of both frusto-cones is the same so that, together, they form a large frusto-cone.

6. Stereoscopic projection system, as claimed in claim 3, in which said projection screen has a flat picture-receiving surface disposed substantially in a plane containing the common axis of the said grids.

FRANÇOIS SAVOYE.

REFERENCES CITED

The following references are of record in the file of this patent:

UNITED STATES PATENTS

| Number | Name | Date |
|---|---|---|
| 1,065,133 | Ivatts | June 17, 1913 |
| 1,071,837 | Wayditch | Sept. 3, 1913 |
| 1,585,129 | Smith | May 18, 1926 |
| 1,613,730 | Steigman | Jan. 11, 1927 |
| 1,772,782 | Noaillon | Aug. 12, 1930 |
| 1,801,656 | Burkhardt | Apr. 21, 1931 |
| 1,944,182 | Jones | Jan. 23, 1934 |
| 1,963,485 | Manifold et al. | June 19, 1934 |
| 2,029,300 | Arfsten | Feb. 4, 1936 |
| 2,060,204 | Hammond, Jr. | Nov. 13, 1936 |
| 2,095,744 | Hanna | Oct. 12, 1937 |
| 2,101,121 | Wixon | Dec. 7, 1937 |
| 2,111,065 | Glanz | Mar. 15, 1938 |
| 2,111,445 | Fuller | Mar. 15, 1938 |
| 2,194,737 | Cathey | Mar. 26, 1940 |

FOREIGN PATENTS

| Number | Country | Date |
|---|---|---|
| 349,548 | Great Britain | May 20, 1931 |
| 822,404 | France | Sept. 20, 1937 |